US012561590B2

(12) United States Patent
Matsumori et al.

(10) Patent No.: US 12,561,590 B2
(45) Date of Patent: Feb. 24, 2026

(54) DEVICE, DESIGN METHOD, AND NON-TRANSITORY COMPUTER READABLE STORAGE MEDIUM FOR DESIGNING FASTENING POINTS OF A SUBSTRATE

(71) Applicant: DENSO CORPORATION, Kariya (JP)

(72) Inventors: Tadayoshi Matsumori, Kariya (JP);
Tadashi Kadowaki, Kariya (JP);
Masato Taki, Kariya (JP)

(73) Assignee: DENSO CORPORATION, Kariya (JP)

( * ) Notice: Subject to any disclaimer, the term of this patent is extended or adjusted under 35 U.S.C. 154(b) by 747 days.

(21) Appl. No.: 17/935,884

(22) Filed: Sep. 27, 2022

(65) Prior Publication Data

US 2023/0162064 A1     May 25, 2023

(30) Foreign Application Priority Data

Oct. 1, 2021     (JP) ................................. 2021-163130

(51) Int. Cl.
*G06N 7/00*          (2023.01)
(52) U.S. Cl.
CPC ..................................... *G06N 7/00* (2013.01)
(58) Field of Classification Search
CPC ....................................................... G06N 7/00
See application file for complete search history.

(56) References Cited

U.S. PATENT DOCUMENTS

2022/0253572 A1     8/2022 Izumi et al.
2025/0105828 A1*     3/2025 Ignjatovic .............. H03K 19/21

FOREIGN PATENT DOCUMENTS

| JP | 2006149091 A | 6/2006 |
|---|---|---|
| JP | 2006-191765 A | 7/2006 |
| JP | 2011-239602 A | 11/2011 |
| JP | 2014160398 A | 9/2014 |
| JP | 2019106757 A | 6/2019 |
| WO | 2018235568 A1 | 12/2018 |

OTHER PUBLICATIONS

Fang et al., "Review of Board-level Solder Joint Reliability under Environmental Stress" 2016 Prognostics and System Health Management Conference, 6 pgs. (Year: 2016).*
Al-Araji et al., "Modeling and Experimental Research of Vibration N Properties of a Multi-Layer Printer Circuit Board," 4th Scientific International Conference 2019, 5 pgs. (Year: 2019).*

(Continued)

*Primary Examiner* — Eric J. Bycer
(74) *Attorney, Agent, or Firm* — Maschoff Brennan

(57)          ABSTRACT

A combination of fastening points is obtained by repeating following steps as an optimum value when an evaluation method of a physical quantity acting on a substrate is specified. The steps include: obtaining the physical quantity according to the combination of fastening points; generating a regression model expressing one fastening point candidate by a binary variable; converting the regression model into an Ising model based on the evaluation method; and determining the combination of fastening points by selecting one of fastening points from the fastening point candidate positions using an Ising machine so as to minimize an evaluation value of the Ising model.

7 Claims, 4 Drawing Sheets

(56) References Cited

OTHER PUBLICATIONS

Goa, Tianlong, "Modal Analysis and Structure Organization of Composite Circuit Board," 2021 7t Annual International Conference on Network and Information Systems for Computers, (Conference held Jul. 23-25, 2021), pp. 358-363 (Year: 2021).*

Kitai, K., Guo, J., Ju, S., Tanaka, S., Tsuda, K., Shiomi, J., & Tamura, R. (2020). Designing metamaterials with quantum annealing and factorization machines. Physical Review Research, 2(1), 013319.

* cited by examiner

DEVICE, DESIGN METHOD, AND NON-TRANSITORY COMPUTER READABLE STORAGE MEDIUM FOR DESIGNING FASTENING POINTS OF A SUBSTRATE

CROSS REFERENCE TO RELATED APPLICATION

The present application claims the benefit of priority from Japanese Patent Application No. 2021-163130 filed on Oct. 1, 2021. The entire disclosure of the above application is incorporated herein by reference.

TECHNICAL FIELD

The present disclosure relates to a design device, a design method and a non-transitory computer readable storage medium for designing a fastening point of a substrate.

BACKGROUND

In a circuit board used in a power control unit of a vehicle or the like, a large number of electronic components is bonded to the circuit board, and a large number of electronic components is connected to the circuit board by connectors. The bonded parts and connections may be broken or disconnected due to external vibration.

A conceivable technique 1 teaches a vibration suppression structure of a circuit board. In this structure, the screw fastening position is provided on the reference straight line LB, and the mounting components of the circuit board are arranged in the vicinity of the reference straight line LB. A conceivable technique 2 teaches a power conversion device having improved vibration resistance of a power supply board. In this device, the resonance frequency of the power supply board is shifted to a higher region than the resonance frequency of the control board by making the distance between the fasteners for the power supply board adjacent to each other narrower than the distance between the fasteners for the control board adjacent to each other.

SUMMARY

According to an example, a combination of fastening points is obtained by repeating following steps as an optimum value when an evaluation method of a physical quantity acting on a substrate is specified. The steps include: obtaining the physical quantity according to the combination of fastening points; generating a regression model expressing one fastening point candidate by a binary variable; converting the regression model into an Ising model based on the evaluation method; and determining the combination of fastening points by selecting one of fastening points from the fastening point candidate positions using an Ising machine so as to minimize an evaluation value of the Ising model.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
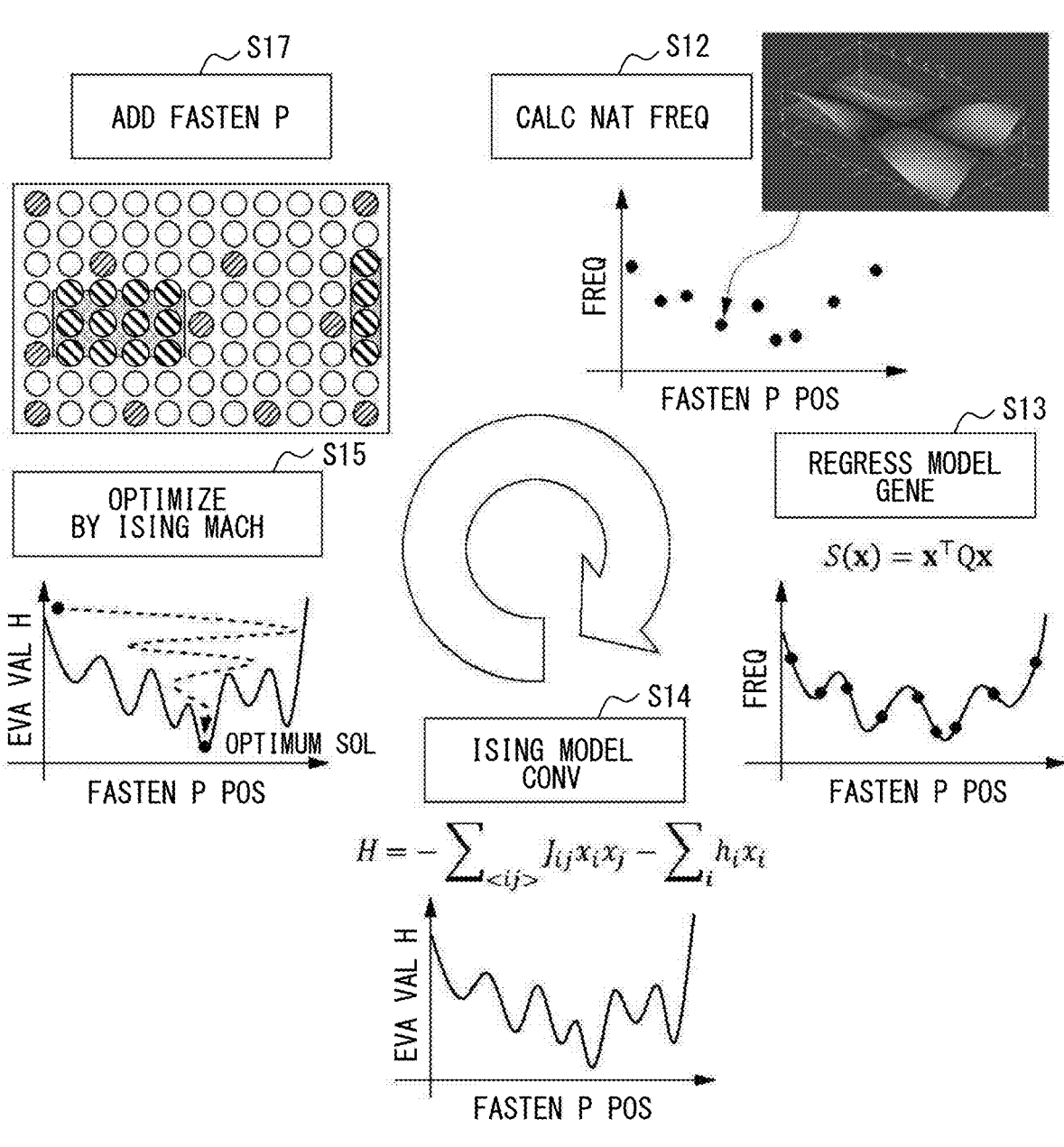
FIG. 1 is a diagram schematically showing a repeat process performed by a design device.

Here, the structure described in the conceivable technique 1 cannot be adopted unless the structure of the substrate is symmetric. Further, the structure described in the conceivable technique 2 cannot be always adopted because there are places on the substrate where the fastening points cannot be arranged. Thus, the fastening points cannot be arranged at any distance.

One method for designing fastening point positions that has the desired performance when a plurality of fastening point position candidates are given is to check the performance of all combinations of all fastening point position candidates. However, when the number of candidates becomes large, the number of combinations of fastening point positions exponentially increases. Therefore, the method of evaluating all combinations has a difficulty that the time for determining the fastening point positions becomes long.

In view of the above background, an object of the present embodiments is to provide a device, a method and a program utilizing the Ising machine as a means of an apparatus that designs a fastening point position having desired performance in a short time when a plurality of fastening point position candidates are given on an arbitrary substrate.

The design device of the present embodiments is a device which selects one of a plurality of fastening points for fastening a substrate from a plurality of fastening point candidate positions and provides a combination of fastening points from the plurality of fastening point candidates. The design device includes: an input unit that accepts a specifying of an evaluation method of a physical quantity acting on a substrate; a physical quantity calculation unit that calculates the physical quantity acting on the substrate according to the combination of fastening points; a regression model generation unit that generates a regression model for the relation between the calculated physical quantity acting on the substrate and the corresponding combination of fastening points based on data of the physical quantity corresponding to the combination of the fastening points and with a binary variable representing one of a plurality of fastening point candidates; an Ising model conversion unit that converts the regression model into an Ising model based on the evaluation method; a fastening point selection unit that selects the one of the plurality of fastening points from the plurality of fastening point candidate positions to determine the combination of fastening points using an Ising machine so as to minimize an evaluation value of the Ising model; and an output unit that outputs data of the combination of the fastening points. Following processes are repeatedly performed until a predetermined termination condition is satisfied: the physical quantity calculation unit calculates the physical quantity acting on the substrate according to the fastening points selected by the fastening point selection unit; the regression model generation unit generates another regression model based on the data of the physical quantity calculated by the physical quantity calculation unit and a corresponding combination of the fastening points; the Ising model conversion unit converts the regression model into the Ising model; and the fastening point selection unit selects the combination of fastening points based on the Ising model.

Hereinafter, embodiments of the present disclosure will be described. The embodiments described below show an example of the present disclosure, and the present disclosure is not limited to the specific configuration described below. In an implementation of the present disclosure, a specific configuration according to the embodiments may be adopted as appropriate.

The design device of the present disclosure is a design device which selects one of a plurality of fastening points for fastening a substrate from a plurality of fastening point candidate positions and provides a combination of fastening points from the plurality of fastening point candidates. The design device includes: an input unit that accepts a specifying of an evaluation method of a physical quantity acting on a substrate; a physical quantity calculation unit that calculates the physical quantity acting on the substrate according to the combination of fastening points; a regression model generation unit that generates a regression model for the relation between the calculated physical quantity acting on the substrate and the corresponding combination of fastening points and expressing one of a plurality of fastening point candidates by a binary variable, based on data of the physical quantity corresponding to the combination of the fastening points; an Ising model conversion unit that converts the regression model into an Ising model based on the evaluation method; a fastening point selection unit that selects the one of the plurality of fastening points from the plurality of fastening point candidate positions to determine the combination of fastening points using an Ising machine so as to minimize an evaluation value of the Ising model; and an output unit that outputs data of the combination of the fastening points. The physical quantity calculation unit calculates the physical quantity acting on the substrate according to the combination of the fastening points selected by the fastening point selection unit until a predetermined termination condition is satisfied. The regression model generation unit generates the regression model based on the data of the physical quantity corresponding to the combination of the fastening points to which the data obtained by calculation is added. The Ising model conversion unit converts the regression model into the Ising model. The fastening point selection unit repeatedly performs a process of selecting the combination of fastening points based on the Ising model.

In this way, a regression model that represents the relationship between the combination of fastening points and the physical quantity is generated. The regression model is converted to the Ising model based on the specified evaluation method. The combination of the fastening points using the Ising machine so as to minimize the evaluation value of the converted Ising model are selected. By repeating the above processes, it is possible to obtain an optimum combination of fastening points that satisfy the design condition from a plurality of fastening point candidate positions.

In the design device of the present embodiment, the Ising model conversion unit may generate the Ising model by using the number of fastening points in addition to the physical quantity acting on the substrate.

In this way, the Ising model is generated using the number of fastening points in addition to the physical quantity acting on the substrate. The combination of fastening points is determined so as to minimize the evaluation value of the Ising model. Thus, it is possible to obtain the combination of fastening points with the small number of fastening points.

In the design device of this embodiment, the natural frequency of the substrate may be selected as the physical quantity.

If an external vibration with the same frequency as the natural frequency of the substrate is applied to the substrate from the outside, the connection or bonding of parts may be broken or disconnected. The resonance of the substrate with the external vibration is prevented by setting the natural frequency of the substrate to be higher than a predetermined threshold value. Thus, it is possible to prevent the resonance of the substrate when a combination of fastening points having a high vibration resistance is designed. In this case, an evaluation method is specified so that the evaluation value of the Ising model becomes lower as the natural frequency is equal to or higher than a predetermined threshold value, and the number of fastening points is smaller.

In the design device of the present embodiment, the regression model generation unit may generate a quadratic polynomial function with binary variables representing which fastening point candidates are used, as the regression model.

The design method of the present disclosure is implemented in a design device which selects one of a plurality of fastening points for fastening a substrate from a plurality of fastening point candidate positions and provides a combination of fastening points. The design method includes: accepting a specifying of the evaluation method of the physical quantity that acts on the substrate; and outputting the combination of fastening points obtained by repeating the following steps as an optimum value until the design device satisfies a predetermined termination condition. The following steps include: (1) a step (S12) of calculating a physical quantity acting on the substrate according to the combination of fastening points; (2) a step (S13) of generating a regression model for a relation between the calculated physical quantity acting on the substrate and the corresponding combination of fastening points based on data of the physical quantity corresponding to the combination of the fastening points to which the data obtained in the step of obtaining the physical quantity is added and with a binary variable representing one of a plurality of fastening point candidates; (3) a step (S14) of converting the regression model into an Ising model based on the evaluation method; and (4) a step (S15) of determining the combination of fastening points by selecting the one of the plurality of fastening points from the plurality of fastening point candidate positions using an Ising machine so as to minimize an evaluation value of the Ising model.

The program of the present embodiment is a program to provide a combination of fastening points by selecting one of a plurality of fastening points for fastening a substrate from a plurality of fastening point candidate positions. The program causes a computer to execute: a step of accepting a specifying of an evaluation method of the physical quantity acting on the substrate; and a step of outputting the combination of fastening points obtained by repeating the following steps as an optimum value until a predetermined termination condition is satisfied. The following steps include: (1) a step (S12) of obtaining a physical quantity acting on the substrate according to the combination of fastening points; (2) a step (S13) of generating a regression model for a relation between the calculated physical quantity acting on the substrate and the corresponding combination of fastening points based on data of the physical quantity corresponding to the combination of the fastening points to which the data obtained in the step of obtaining the physical quantity is added and with a binary variable representing one of a plurality of fastening point candidates; (3) a step (S14) of converting the regression model into an Ising model based on the evaluation method; and (4) a step (S15) of determining the combination of fastening points by selecting the one of the plurality of fastening points from the plurality of fastening point candidate positions using an Ising machine so as to minimize an evaluation value of the Ising model.

Hereinafter, the design device according to the embodiment will be further described with reference to the drawings.

FIG. 1 is a diagram for explaining an outline of a processing performed by the design device 1 of the present embodiment. "(S12)" and the like described in FIG. 1 are symbols used in the flowchart of FIG. 4 described later.

The explanation starts from "Addition of fastening points". "Addition of fastening points" is a step of adding a combination of fastening points as an evaluation target for the natural frequency of the substrate. Initially, the combination of fastening points given as an initial value is added, and after the combination of fastening points is selected by the Ising machine, the selected combination of fastening points is added. When the combination of fastening points are added, the natural frequency of the substrate is calculated in "a calculation of natural frequency" when the added combination of the fastening points is adopted. In the image of the graph shown in FIG. 1, the natural frequency of the substrate and the corresponding combination of fastening points are plotted. As is clear from FIG. 1, the accuracy of the regression model is improved much more when the data of the combination of fastening points increases.

Next, "regression model generation" generates a regression model of the combination of fastening points and the natural frequency. Subsequently, "Ising model conversion" generates an Ising model for obtaining a natural frequency equal to or higher than a predetermined threshold value having the minimum number of fastening points.

Next, in "an optimization by Ising machine", a combination of fastening points that minimizes the evaluation value of the Ising model is obtained using the Ising machine. The obtained combination of the fastening points is added as the fastening points to be the next evaluation target, and then, the processes in FIG. 1 are repeated. As shown in FIG. 1, since the number of the data sets of the natural frequency and the corresponding combination of the fastening points increases due to the repeating of the processing, the accuracy of the regression model is improved, and the combination of the fastening points obtained based on the Ising model is also approaching the optimum value. Finally, when the predetermined termination condition is satisfied, the combination of fastening points obtained by the Ising machine is output as the optimum value of the combination of fastening points.

In the present embodiment, the design task is to ensure vibration resistance and reduce the number of fastening points as small as possible. That is, ensuring of the vibration resistance is dealt with a constraint condition, and the number of fastening points is reduced. Here, the constraint condition is described. The vibration resistance characteristics of the substrate are secured by keeping the natural frequency of the substrate over a predetermined threshold value. To calculate the natural frequency, the Computer-Aided Engineering (CAE) for vibration is required. Therefore, the CAE should be executed every time the arrangement of the fastening points is decided. Therefore, when the above constraint condition related to the design task is described as an optimization problem, the optimum problem should have two constraint conditions. One is a condition that the natural frequency of the substrate is kept over a predetermined threshold value, and the other is a condition for the CAE for vibration of the substrate which is necessary to calculate the natural frequency. The design device 1 of the present embodiment efficiently solves the combinatorial optimization problem of selecting a fastening point from a plurality of fastening point candidate positions, and obtains the optimized combination of fastening points satisfying the constraint conditions.

The optimization problem corresponding to the design task is expressed by the following Equations (1a) to (1c) using the objective function F (x) and the constraints $G_1$ (x) and $G_2$ (x). $G_2$ (x) is an equation necessary to obtain the natural frequency f of the substrate, and $G_1$ (x) is evaluated based on the value of f obtained as a result of solving the equation of $G_2$ (x), so it is necessary to calculate these at the same time in the optimization problem.

[Equation 1]

$$\operatorname*{argmin}_{x \in \{0,1\}^n} F(x) = \sum_{i=1}^{n} x_i, \tag{1a}$$

$$\text{subject to } G_1(u) = f - \bar{f} \geq 0, \tag{1b}$$

$$G_2(x) = \det|K(x) - \omega^2 M(x)| = 0, \tag{1c}$$

Here, x represents a design variable indicating existence and non-existence of the fastening point, "f=ω/2π" represents the natural frequency, "f̄", over-lined f represents a lower limit value of the natural frequency, K and M represent a rigidity matrix and a mass matrix, respectively.

In order to solve the above optimization problem expressed by Equations (1a) to (1c) with an Ising machine, it is necessary to convert the optimum problem into an Ising model expressed by Equation (2) represented by a quadratic polynomial of a binary variable x. The Ising machine finds a combination of fastening points that minimizes Hamiltonian H. H is the evaluation value of the Ising model.

[Equation 2]

$$H = -\sum_{<ij>} J_{ij} x_i x_j - \sum_i h_i x_i \tag{2}$$

The Ising model expressed by Equation (2) is equivalent to the quadratic unconstrained binary optimization (QUBO) that is formulated as the optimization problem of the quadratic polynomial using only binary variables without any constraint function. Therefore, if the above optimization problem can be transformed into QUBO, it can be solved by the Ising solver. However, the optimization problem has a constraint function, and the constraint function includes a natural frequency f which is a function of a binary variable x but is not represented by a quadratic polynomial. Therefore, as a means to express the constraint functions $G_1$ and $G_2$ including the natural frequency f by a quadratic polynomial of binary variables, or to express both the objective function F and the constraint functions $G_1$ and $G_2$ at the same time by QUBO, the regression model S (x) of a quadratic polynomial with a binary variable x is utilized.

[Equation 3]

$$S(x) = x^T Q x \tag{3}$$

As the simplest embodiment, a method of using the regression model S (x) to express the constraint functions related to the natural frequency as a binary variable is shown. In this method, the evaluation value of the constraint function of Equations (1b) and (1c) is approximated by the regression model S (x) using the natural frequency f calculated in advance by the natural frequency calculation unit 21.

[Equation 4]

$$S(x) \approx (f - \bar{f})^2 \tag{4}$$

The regression model S (x) of the Equation (4) and the objective function F (x) originally represented only by the variable x representing the fastening point position, that is, the following Equation (5) obtained by adding the number of fastening points is QUBO, all terms of which are represented by a quadratic polynomial of binary variables.

[Equation 5]

$$\operatorname*{argmin}_{x \in \{0,1\}^n} w_1 F(x) + w_2 S(x) \tag{5}$$

Here, w1 and w2 take positive values et for each design target.

As another embodiment in which the constraint function related to the natural frequency is represented by the regression model S (x), the above optimization problem is solved by formulating as the multi-objective optimization in which the number of fastening points is minimized and the natural frequency f is maximized at the same time. In this method, the natural frequency f is approximated directly by the regression model S (x).

[Equation 6]

$$S(x) \approx f \tag{6}$$

Similar to Equation (5), the following Equation (7), which is the sum of the regression model S (x) of Equation (6) and the objective function F (x), is QUBO because all terms of which are represented by a quadratic polynomial of binary variables.

[Equation 7]

$$\operatorname*{arg\,min}_{x \in \{0,1\}^n} w_1 F(x) - w_2 S(x) \tag{7}$$

Though, in Equations (4) and (6), the regression model S (x) is utilized to approximates the natural frequency which is not represented by the binary variable x, the regression model may be utilized to approximate not only the natural frequency but also a part that can be represented by the binary variable. This corresponds to the above-mentioned feature such that "expression of QUBO in which the objective function and the constraint function are handled at the same time." For example, following the Equation (5), the sum $L_1$ in Equation (8) of the objective function F (x) representing the number of fastening points and the constraint function of the natural frequency f is assumed to be minimized.

[Equation 8]

$$L_1 = w_1 F(x) + w_2 (f - \bar{f})^2 \tag{8}$$

By approximating $L_1$ using the regression model S (x), QUBO shown in the following Equation (9) can be obtained.

[Equation 9]

$$\operatorname*{argmin}_{x \in \{0,1\}^n} S(x) \tag{9}$$

The regression model S (x) is a quadratic polynomial of binary variables as shown in Equation (3), and Equation (9) is QUBO.

Further, when the number of fastening points is minimized and the natural frequency f is maximized at the same time as in the Equation (7), the sum $L_2$ of the number of fastening points and the natural frequency f is evaluated.

[Equation 10]

$$L_2 = w_1 F(x) - w_2 f \tag{10}$$

By approximating $L_2$ with the regression model S (x), QUBO as shown in the Equation (9) can be also obtained.

Equation (10) is a method of combining a multi-objective optimization formulation and the use of the regression model, and may be combined with other multi-objective optimization methods such as the ε-constraint method and the weighted Ip norm method.

Figure 2:
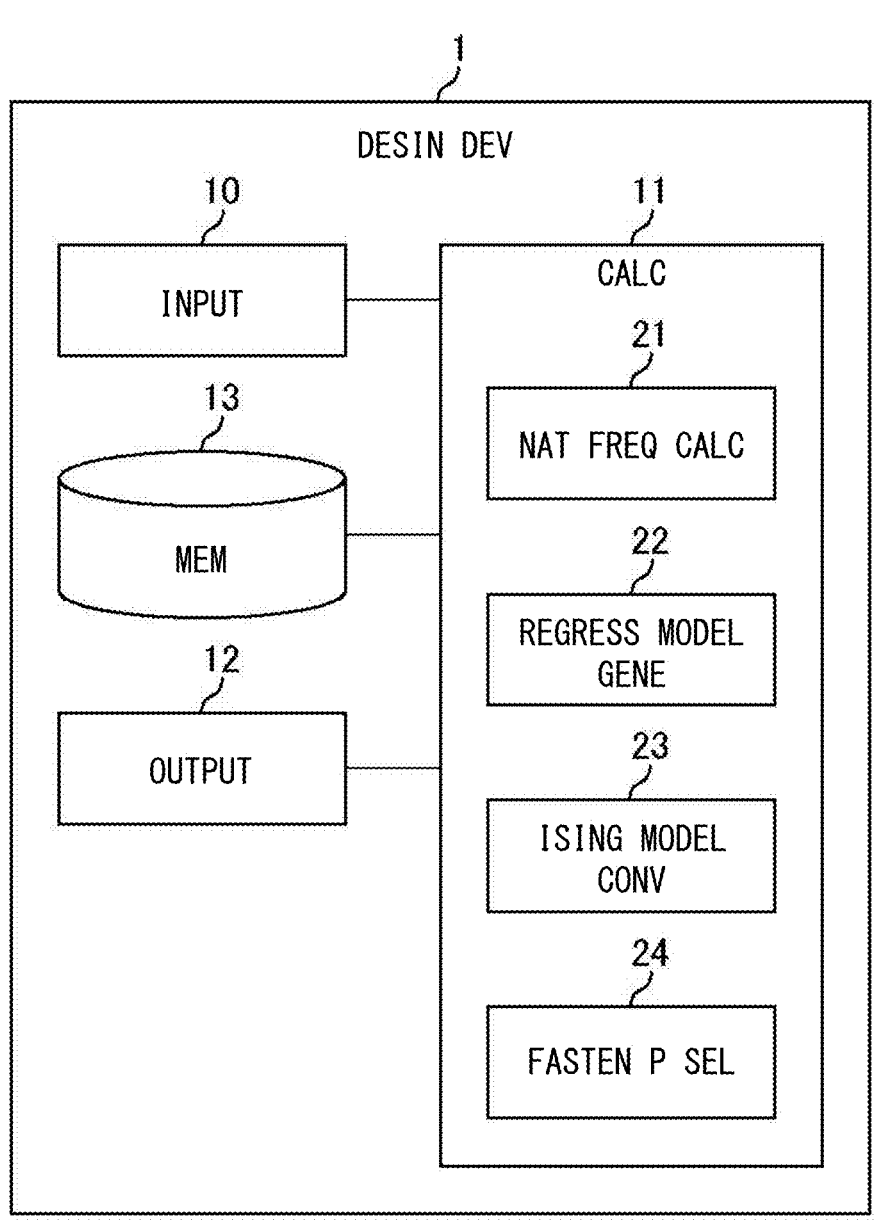
FIG. 2 is a diagram showing a configuration of a design device according to an embodiment.

FIG. 2 is a diagram showing a configuration of a design device 1 according to an embodiment. The design device 1 is a device for designing a fastening point positions for fastening a substrate and is a device for selecting the combination of them from a plurality of fastening point candidate positions. The substrate as a design target which the design device 1 deals with may be a board for arranging components that have some functions, for example, a circuit board or a printed circuit board, one of which is an in-vehicle printed circuit board.

The design device 1 has an input unit 10 that receives a designation of an evaluation method and the like, a calculation unit 11 that obtains a combination of fastening points matching the design condition, an output unit 12 that outputs calculation results, and a memory 13 that stores various data during the calculation. The calculation unit 11 provides the functions of the natural frequency calculation unit 21, the regression model generation unit 22, the Ising model conversion unit 23, and the fastening point selection unit 24.

In the present embodiment, the input unit 10 accepts the specifying of the evaluation method. In the present embodiment, the evaluation method is such that the smaller number of fastening points is preferable under a condition that the natural frequency acting on the substrate is equal to or higher than a predetermined threshold value. By setting the natural frequency of the substrate given as a threshold value to a value larger than the frequency applied from the outside, resonance of the substrate can be prevented.

The natural frequency calculation unit 21 calculates the natural frequency of the substrate in accordance with the combination of fastening points by a simulation. The natural frequency of the substrate is the natural frequency of the substrate on which the component is mounted, that is, the natural frequency considering both the substrate and the components on the substrate.

Figure 3:
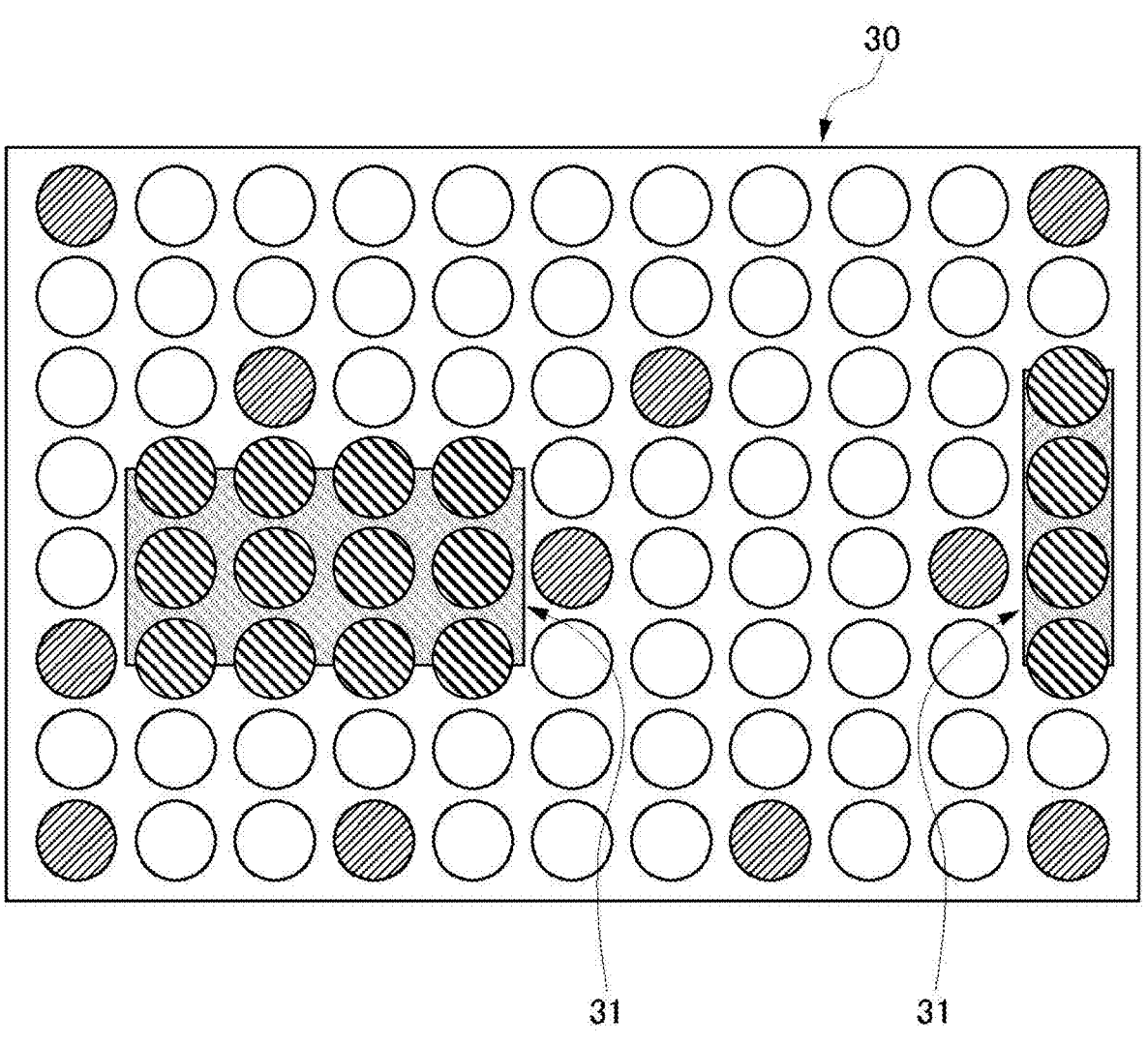
FIG. 3 is a diagram showing an example of fastening point candidate positions and selected fastening points.

The regression model generation unit 22 generates a regression model to approximate the relation between the combination of fastening points and the corresponding natural frequency. In the regression model, the fastening point candidates are expressed by a binary variable which represents whether or not a candidate is selected as the fastening point. FIG. 3 is a diagram showing an example of fastening point candidate positions on the substrate 30 and selected fastening points. In FIG. 3, a white circle indicates a position of a fastening point candidate, and a rough hatched circle indicates a position where a fastening point cannot be arranged, that is, the rough hatched circle positions are not the candidates of the fastening points. The position where the fastening point cannot be arranged is shown as grey square areas 31 such that the electronic components whose arrangement is fixed in advance exist. The dense hatched circle shows a fastening point selected from the fastening point candidate positions. That is, the plurality of fastening points indicated by the dense hatched circles are illustrated as a selected combination of the fastening points. When a fastening point candidate is selected as a fastening point, the corresponding binary variable is equal to "1", and when a fastening point candidate is not selected as a fastening point, the corresponding binary variable is equal to "0".

Since the regression model generation unit 22 generates a regression model using all the data sets of the combinations of the fastening points obtained at this moment, the accuracy of the regression model is improved with the data set size of the fastening points. The regression model generation unit 22 estimates the coefficient Q of the Equation (3) based on the data sets of the combination of the fastening points and the corresponding natural frequency stored in the memory 13, and generates the regression model S (x).

The Ising model conversion unit 23 transforms the above optimization problem into an Ising model expressed by Equation (2) that can be calculated by the Ising machine, that is, to establish QUBO using the regression model S (x) expressed as the Equations (5), (7), and (9). The values $J_{ij}$ and hi which are the elements of coefficients J and h correspond to the coefficient of the interaction $x_i x_j$ of the two binary variables $x_i$ and $x_j$ in QUBO and the coefficient of the binary variable $x_i$. The Ising machine obtains the optimum fastening point position according to the evaluation value H of the Ising model. Even if a polynomial including a third-order or higher interaction of a binary variable is set in the regression model, or the objective function or constraint functions of the above optimization problem, it is converted into a quadratic polynomial including two interactions ("Basics of Quantum Annealing" (Hidetoshi Nishimori, Masayuki Ozeki/Kyoritsu Publishing), p. 13 "2.4 Expression on Real Devices"), and can be transformed into the Ising model.

The fastening point selection unit 24 selects a combination of fastening points that minimizes the evaluation value H of the Ising model using an Ising machine. For the optimization problem finding the combination of the fastening points that minimizes the evaluation value H, when the number of candidates for the fastening point candidates increases, the existing Neumann computer requires a large amount of calculation time to obtain the optimum solution. In this embodiment, a combination of fastening points is calculated using an Ising machine such as quantum annealing. The Ising machine may be a quantum computer that implements quantum annealing, or a computer that uses an FPGA, GPU, or the like that implements an algorithm specialized for combinatorial optimization.

The design device 1 designs a combination of fastening points satisfying the design condition from a plurality of fastening point candidate positions by the function of the calculation unit 11 described above.

Figure 4:
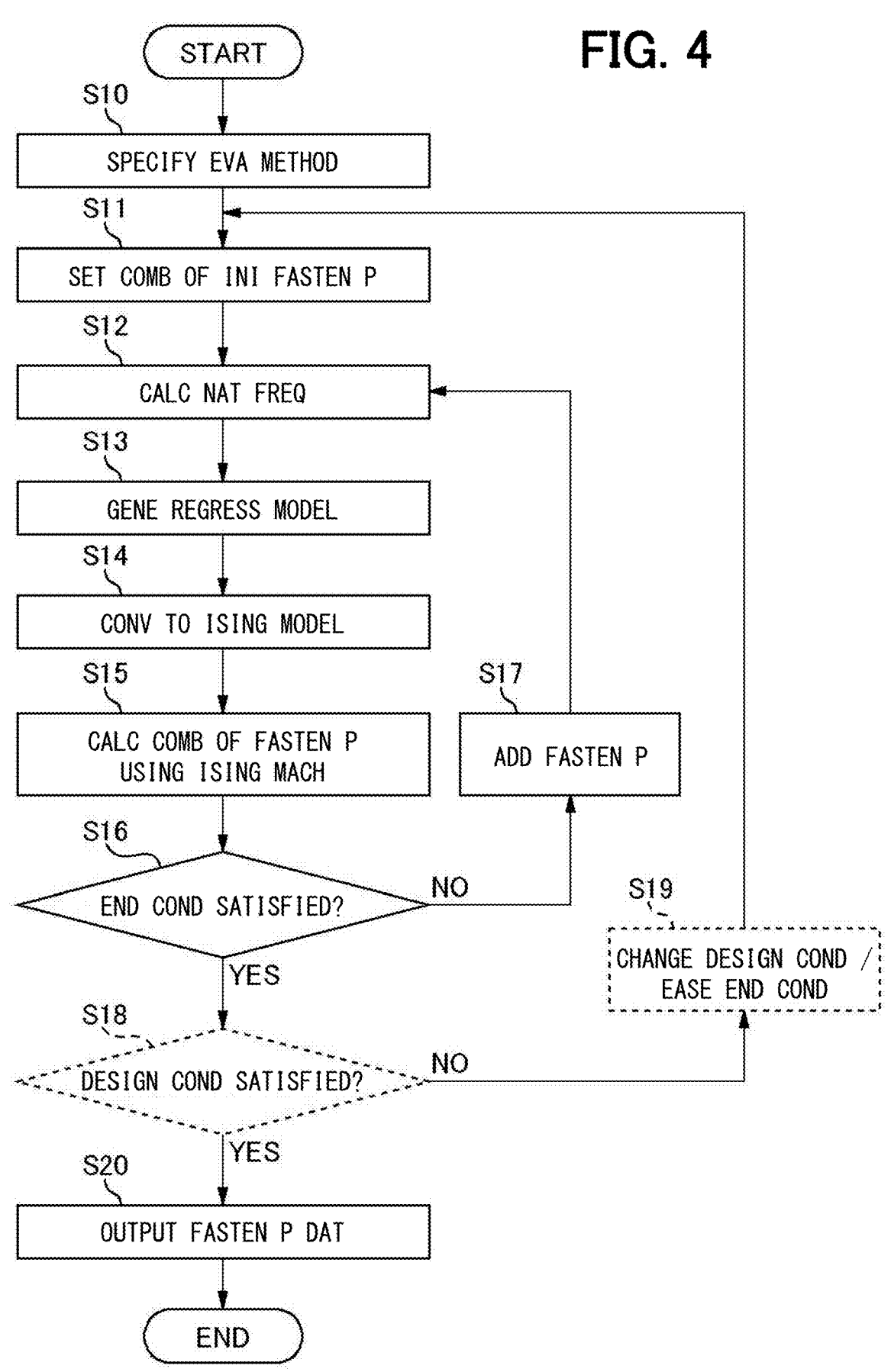
FIG. 4 is a flowchart showing a design method of the embodiment.

FIG. 4 is a flowchart showing a process of designing a combination of fastening points by the design device 1 of the embodiment. The design device 1 receives the designation of the evaluation method by the input unit 10 (at S10). In the present embodiment, the evaluation method is that it is desirable that the natural frequency acting on the substrate is equal to or higher than a predetermined threshold value (for example, 500 Hz) and the number of fastening points is small. The design condition in this evaluation method is that the natural frequency acting on the substrate is equal to or higher than a predetermined threshold value. The design condition may be that the natural frequency is as high as possible. Further, the design device 1 accepts the input data of the initial combination of the fastening points (at S11). Here, an example of accepting input data of an initial combination of fastening points is described, alternatively, the initial combination of fastening points may be randomly determined.

Next, the natural frequency calculation unit 21 of the design device 1 calculates the natural frequency of the substrate with the initial combination of the fastening points (at S12). Then, the natural frequency calculation unit 21 stores the obtained natural frequency and the corresponding combination of the fastening points in the memory 13.

Subsequently, the regression model generation unit 22 of the design device 1 generates a regression model based on all the data of the natural frequencies and the corresponding combination of the fastening points stored in the memory 13 (at S13). The Ising model conversion unit 23 constructs an Ising model from a regression model and an objective function. The fastening point selection unit 24 of the design device 1 selects the one of the plurality of fastening points from the plurality of fastening point candidate positions to determine the combination of fastening points using an Ising machine so as to minimize an evaluation value of the Ising model (at S15).

The design device 1 judges whether or not the termination condition of fastening point selection is satisfied (at S16). Here, examples of the termination condition may be specified by the number of additions of the combination of fastening points, and/or may be specified by the calculation time. If the number of additions of the combination of fastening points is specified as the termination condition, the calculation process terminates when the number of additions reaches a predetermined number. When the calculation time is specified as the termination condition, the calculation process terminates when the calculation time exceeds the predetermined time at the time of determining the termination condition (at S16). If the termination condition is not satisfied ("NO" in S16), the design device 1 adds a selected fastening point (at S17), and returns to the process (at S12) to calculate the natural frequency of the substrate with the combination of the added fastening points. Here, the addition of the fastening points (at S17) means that the combination of the fastening points selected by the fastening point selection unit 24 is adopted as the combination of the fastening points used in the calculation of the natural frequency.

The design device 1 calculates the natural frequency of the substrate for the added combination of the fastening points (at S12), stores the data set of the obtained natural frequency of the substrate and the new corresponding combination of the fastening points in the memory 13 (at S13), generates the regression model showing the relationship of all the data set of the natural frequencies and the corresponding combinations of the fastening points stored in the memory 13 (at S14), and calculates the combination of fastening points that minimizes the evaluation value of the Ising model constructed from the determined regression model (at S15), and repeats these processes.

When it is determined that the termination condition is satisfied ("YES" in S16) in the determination (S16) of whether or not the termination condition is satisfied, the design device 1 determines whether the arbitrarily obtained combination of fastening points satisfies the design condition (at S18). As a result, if it is determined that the obtained results satisfy the design condition ("YES" in S18), the obtained data of the fastening points is output (at S20), and the process terminates.

When it is determined that the obtained results of the combination of fastening points do not satisfy the design condition ("NO" in S18), the design condition is changed and the termination condition is relaxed (at S19). After that, in the same manner as in the above-mentioned processes, the combination of fastening points is designed. Here, the relaxation of the termination condition means, for example, increasing the number of times to add a combination of fastening points or lengthening the calculation time. By relaxing the termination condition in this way, a combination of fastening points that satisfies the design condition will be found in high possibility. In addition, although the examples in which both the design condition is changed and the termination condition is relaxed is given here, either one may be performed.

Although the configuration of the design device 1 according to the present embodiment has been described above, an example of hardware of the design device 1 described above is a computer including a CPU, a RAM, a ROM, a hard disk, a display, a keyboard, a mouse, a communication interface, and the like. The design device 1 is realized by storing a program having modules for realizing the functions described above in a RAM or a ROM and executing the program by a CPU. The program described above also falls within the scope of the present disclosure. When a quantum computer is used as the Ising machine, the design device 1 includes a combination of a Neumann type computer and a quantum computer.

The design device 1 of the present embodiment is configured to determine a combination of fastening points that minimizes the evaluation value expressed in the form of the Equation (2) by using an Ising machine, and it is possible to obtain an appropriate combination of fastening points that satisfy the vibration-resistant performance from a plurality of fastening point candidate positions. By using the Ising machine, it is possible to determine the desired fastening point positions in a shorter time than calculating the evaluation value sequentially for all combinations of the plurality of fastening point candidate positions.

In the above-described embodiment, an example in which the natural frequency of the substrate is set as a design condition is given, alternatively, another physical quantity may be set as a design condition. For example, in addition to the natural frequency, displacement or stress acting on the substrate may be used as a design condition. In this case, the natural frequency, displacement, and stress calculated by the vibration CAE are stored in the storage unit, and the regression model is generated by the regression model generation unit using these values or a value including an objective function or a constraint function represented by other binary variables. Thus, a combination of fastening points satisfying the design condition may be obtained by performing the same processing as in the above-described embodiment.

The present embodiment may be useful as an apparatus for designing a fastening point of a substrate.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

Here, the process of the flowchart or the flowchart described in this application includes a plurality of sections (or steps), and each section is expressed as, for example, S12. Further, each section may be divided into several subsections, while several sections may be combined into one section. Furthermore, each section thus configured may be referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A design device for selecting one of a plurality of fastening points for fastening a substrate from a plurality of fastening point candidate positions and setting a combination of the fastening points, the design device comprising:

an input unit that accepts a specifying of an evaluation method that evaluates a natural frequency acting on a substrate relative to a combination of fastening points;

a physical quantity calculation unit that obtains the natural frequency acting on the substrate relative to the combination of fastening points;

a regression model generation unit that generates a regression model which approximates a relation between the natural frequency acting on the substrate and the combination of fastening points based on data of the natural frequency relative to the combination of the fastening points, wherein the fastening point candidates are expressed by a binary variable that represents whether a fastening point candidate is selected as a fastening point;

an Ising model conversion unit that converts the regression model into an Ising model based on the evaluation method specified in the input unit;

a fastening point selection unit that determine the combination of fastening points by selecting the one of the plurality of fastening points from the plurality of fastening point candidate positions using an Ising machine so as to minimize an evaluation value of the Ising model, wherein the evaluation method lowers the evaluation value of the Ising model as the number of fastening points is smaller when the natural frequency is equal to or higher than a predetermined threshold value, wherein the combination of fastening points is determined so as to set the natural frequency of the substrate to be higher than a predetermined threshold value, so that a resonance of the substrate with an external vibration is restricted and a vibration resistance for preventing the resonance of the substrate becomes higher than the predetermined value; and an output unit that outputs data of the combination of the fastening points, wherein:

following processes are repeatedly performed until a predetermined termination condition is satisfied:

the physical quantity calculation unit calculates the natural frequency acting on the substrate according to the fastening points selected by the fastening point selection unit;

the regression model generation unit generates another regression model based on a data set of the natural frequency calculated by the physical quantity calculation unit and a corresponding combination of the fastening points;

the Ising model conversion unit converts the regression model into the Ising model; and the fastening point selection unit selects the combination of fastening points based on the Ising model, wherein the design device further comprises:

one or more processors; and a memory coupled to the one or more processors and storing program instructions that when executed by the one or more processors cause the one or more processors to provide at least: the input unit; the physical quantity calculation unit; the regression model generation unit; the Ising model conversion unit; the fastening point selection unit; and the output unit.

2. The design device according to claim 1, wherein:

the Ising model conversion unit generates the Ising model using a numerical number of fastening points in addition to the natural frequency acting on the substrate.

3. The design device according to claim 1, wherein:

the regression model generation unit generates a function expressed by a quadratic polynomial in which a fastening point candidate is represented by a binary variable.

4. The design device according to claim 1, wherein:

the physical quantity calculation calculates the natural frequency using a vibration CAE of the substrate based on an arrangement of the combination of fastening points.

5. The design device according to claim 1, wherein:

the regression model showing a relationship between the combination of fastening points and the natural frequency applied to the substrate is expressed by the binary variable which represents whether or not the fastening point candidate is selected as the fastening point;

when the fastening point candidate is selected as the fastening point, a corresponding binary variable is equal to "1";

when the fastening point candidate is not selected as the fastening point, the corresponding binary variable is equal to "0"; and the Ising model conversion unit constructs the Ising model from the regression model and an objective function originally represented only by a variable representing a position of the fastening point.

6. A design method for selecting one of a plurality of fastening points for fastening a substrate from a plurality of fastening point candidate positions and setting a combination of the fastening points, the design method comprising:

accepting a specifying of an evaluation method that evaluates a natural frequency acting on the substrate relative to a combination of fastening points; and outputting a combination of fastening points obtained by repeating following steps as an optimum value until a predetermined termination condition is satisfied, wherein:

the steps include:

obtaining the natural frequency acting on the substrate relative to the combination of fastening points;

generating a regression model which approximates a relation between the natural frequency acting on the substrate and the combination of fastening points based on data of the natural frequency relative to the combination of the fastening points, wherein the fastening point candidates are expressed by a binary variable that represents whether a fastening point candidate is selected as a fastening point;

converting the regression model into an Ising model based on the evaluation method; and determining the combination of fastening points by selecting the one of the plurality of fastening points from the plurality of fastening point candidate positions using an Ising machine so as to minimize an evaluation value of the Ising model, wherein the evaluation method lowers the evaluation value of the Ising model as the number of fastening points is smaller when the natural frequency is equal to or higher than a predetermined threshold value, wherein the combination of fastening points is determined so as to set the natural frequency of the substrate to be higher than a predetermined threshold value, so that a resonance of the substrate with an external vibration is restricted and a vibration resistance for preventing the resonance of the substrate becomes higher than the predetermined value.

7. A non-transitory tangible computer readable storage medium comprising instructions being executed by a computer, the instructions including a computer-implemented method for selecting one of a plurality of fastening points for fastening a substrate from a plurality of fastening point candidate positions and setting a combination of the fastening points, the instructions including:

accepting a specifying of an evaluation method of that evaluates a natural frequency acting on the substrate relative to a combination of fastening points; and outputting a combination of fastening points obtained by repeating following steps as an optimum value until a predetermined termination condition is satisfied, wherein:

the steps include:

obtaining the natural frequency acting on the substrate relative to the combination of fastening points;

generating a regression model which approximates a relation between the natural frequency acting on the substrate and the combination of fastening points based on data of the natural frequency relative to the combination of the fastening points, wherein the fastening point candidates are expressed by a binary variable that represents whether a fastening point candidate is selected as a fastening point;

converting the regression model into an Ising model based on the evaluation method; and determining the combination of fastening points by selecting the one of the plurality of fastening points from the plurality of fastening point candidate positions using an Ising machine so as to minimize an evaluation value of the Ising model, wherein the evaluation method lowers the evaluation value of the Ising model as the number of fastening points is smaller when the natural frequency is equal to or higher than a predetermined threshold value, wherein the combination of fastening points is determined so as to set the natural frequency of the substrate to be higher than a predetermined threshold value, so that a resonance of the substrate with an external vibration is restricted and a vibration resistance for preventing the resonance of the substrate becomes higher than the predetermined value.

\* \* \* \* \*